(12) United States Patent
Klaphake et al.

(10) Patent No.: US 9,618,156 B2
(45) Date of Patent: Apr. 11, 2017

(54) ELECTRONIC PUMP MOTOR CONTROL

(71) Applicant: Graco Minnesota Inc., Minneapolis, MN (US)

(72) Inventors: Andrew J. Klaphake, Minneapolis, MN (US); Eric J. Mjolhus, Ramsey, MN (US); Suresha S. Nijaguna, Plymouth, MN (US); Jesse L. Lanie, Ihlen, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/909,248

(22) PCT Filed: Aug. 7, 2014

(86) PCT No.: PCT/US2014/050103
§ 371 (c)(1),
(2) Date: Feb. 1, 2016

(87) PCT Pub. No.: WO2015/021252
PCT Pub. Date: Feb. 12, 2015

(65) Prior Publication Data
US 2016/0186740 A1   Jun. 30, 2016

Related U.S. Application Data

(60) Provisional application No. 61/863,334, filed on Aug. 7, 2013.

(51) Int. Cl.
F04B 49/06 (2006.01)
F16N 37/00 (2006.01)
(Continued)

(52) U.S. Cl.
CPC .............. *F16N 37/00* (2013.01); *F01M 1/02* (2013.01); *F01M 11/0004* (2013.01);
(Continued)

(58) Field of Classification Search
CPC .............. F01M 1/02; F01M 2001/0253; F04B 2203/0201; F16N 13/04; F16N 13/06; F16N 29/02
(Continued)

(56) References Cited

U.S. PATENT DOCUMENTS 4,102,394 A * 7/1978 Botts ....................... E21B 43/00
166/113
4,505,405 A   3/1985 Kelly et al.
(Continued)

FOREIGN PATENT DOCUMENTS

CN     1160135 A    9/1997
CN   202381137 U    8/2012
(Continued)

OTHER PUBLICATIONS

International Search Report and Written Opinion from PCT Application Serial No. PCT/US2014/050103, dated Nov. 18, 2014, 9 pages.

(Continued)

*Primary Examiner* — Patrick Hamo
(74) *Attorney, Agent, or Firm* — Kinney & Lange, P.A.

(57) ABSTRACT

A motor control system for a lubricant pump motor comprises a pump system power input, a motor drive, a current sensor, a lubrication controller, and a drive controller. The pump system power input is configured to supply system power. The motor drive is configured to drive the lubricant pump motor using the system power. The current sensor is disposed between the pump system power input and the motor drive to sense an input current of the system power. The lubrication controller configured to provide motor activation signals. The drive controller is disposed to receive the motor activation signals via an isolated digital input, and to control the motor drive as a function of the sensed input (Continued)

current and a user-defined current set-point, in response to the activation signals.

13 Claims, 3 Drawing Sheets

(51) Int. Cl.
*F04B 53/18* (2006.01)
*F04B 17/03* (2006.01)
*F16N 19/00* (2006.01)
*F16N 31/02* (2006.01)
*F01M 1/02* (2006.01)
*F01M 11/00* (2006.01)
*F04B 19/22* (2006.01)
*F04C 2/08* (2006.01)
*F04C 14/00* (2006.01)
*F04C 15/00* (2006.01)
*F16N 7/40* (2006.01)
*F16N 21/00* (2006.01)
*F16N 29/00* (2006.01)
*F16N 13/00* (2006.01)
*G01F 23/22* (2006.01)
*G01F 23/40* (2006.01)

(52) U.S. Cl.
CPC .............. *F04B 17/03* (2013.01); *F04B 19/22* (2013.01); *F04B 49/06* (2013.01); *F04B 49/065* (2013.01); *F04B 53/18* (2013.01); *F04C 2/08* (2013.01); *F04C 14/00* (2013.01); *F04C 15/008* (2013.01); *F16N 7/40* (2013.01); *F16N 13/00* (2013.01); *F16N 19/00* (2013.01); *F16N 19/003* (2013.01); *F16N 21/00* (2013.01); *F16N 29/00* (2013.01); *F16N 31/02* (2013.01); *G01F 23/22* (2013.01); *G01F 23/40* (2013.01); *F01M 2001/023* (2013.01); *F01M 2001/0215* (2013.01); *F01M 2001/0238* (2013.01); *F01M 2001/0253* (2013.01); *F04B 2203/0201* (2013.01); *F16N 2037/006* (2013.01)

(58) Field of Classification Search
USPC .......................................................... 417/45
See application file for complete search history.

(56) References Cited

U.S. PATENT DOCUMENTS

| 5,181,585 | A | 1/1993 | Braun et al. |
| 5,733,048 | A | 3/1998 | El-Ibiary et al. |
| 8,424,722 | B2 | 4/2013 | Koch et al. |
| 8,698,447 | B2* | 4/2014 | Lumsden ................ H02P 6/002 318/400.14 |
| 8,827,656 | B2* | 9/2014 | Sano .................... F16H 61/0206 417/45 |
| 2012/0063922 | A1* | 3/2012 | Sano .................... F16H 61/0206 417/44.1 |
| 2012/0132305 | A1* | 5/2012 | Conley .................... F16N 7/14 137/565.17 |
| 2012/0213645 | A1* | 8/2012 | Lumsden ................ H02P 6/002 417/44.1 |
| 2013/0168187 | A1 | 7/2013 | Conley et al. |

FOREIGN PATENT DOCUMENTS

| CN | 103712045 A | 4/2014 |
| JP | 11013485 A | 1/1999 |

OTHER PUBLICATIONS

Office Action for CN Application Serial No. 201480042935.4, Dated Dec. 8, 2016, 8 Pages.

* cited by examiner

ELECTRONIC PUMP MOTOR CONTROL

INCORPORATION BY REFERENCE

U.S. provisional application No. 61/863,334 is hereby incorporated by reference in its entirety.

BACKGROUND

The present invention relates generally to lubrication systems. More particularly, the invention relates to an electronic control system for a pump motor of a mobile lubrication system.

Industrial and construction machinery often requires lubrication to function. Seals, pistons, and bearings of such machinery may require substantial volumes of grease, oil, or other lubricant to protect against wear, prevent corrosion, and/or reduce frictional heating. Mobile machinery is often incorporated into or transported by industrial vehicles, which commonly use portable local lubrication assemblies wherein local lubricant pumps, reservoirs, and injectors are affixed vehicles or devices to ensure adequate lubrication. Local reservoirs have limited capacity sufficient to handle extended ordinary operation, and are refilled with lubricant from a larger source, as needed. Local lubrication assemblies often supply lubricant to multiple lubricant injectors dedicated to different machinery.

SUMMARY

In a first embodiment, a motor control system for a lubricant pump motor comprises a pump system power input, a motor drive, a current sensor, a lubrication controller, and a drive controller. The pump system power input is configured to supply system power. The motor drive is configured to drive the lubricant pump motor using the system power. The current sensor is disposed between the pump system power input and the motor drive to sense an input current of the system power. The lubrication controller configured to provide motor activation signals. The drive controller is disposed to receive the motor activation signals via an isolated digital input, and to control the motor drive as a function of the sensed input current and a user-defined current set-point, in response to the activation signals.

In a second embodiment, a lubrication system comprises a lubricant reservoir, a lubricant pump configured to draw fluid from the lubricant reservoir, a pump motor, a system power input, a lubrication controller, and a motor controller. The pump motor is configured to drive the lubricant pump, and the system power input provides electrical input power to drive the pump motor. The lubrication controller is configured to provide activation signals for the pump motor. The motor controller is disposed to receive the activation signals as an isolated digital input, and control electrical power delivered from the system power input to the pump motor using a drive controller as a function of a user-defined current set-point and a sensed current of the electrical input power, in response to the activation signals.

DETAILED DESCRIPTION

The lubrication system of the present invention includes an electronic pump motor controller that receives activation commands as an isolated digital input, and produces a motor control signal in response to the activation commands that are a function of a user-defined current set-point and a sensed input current, using a drive controller running a control loop.

Figure 1:
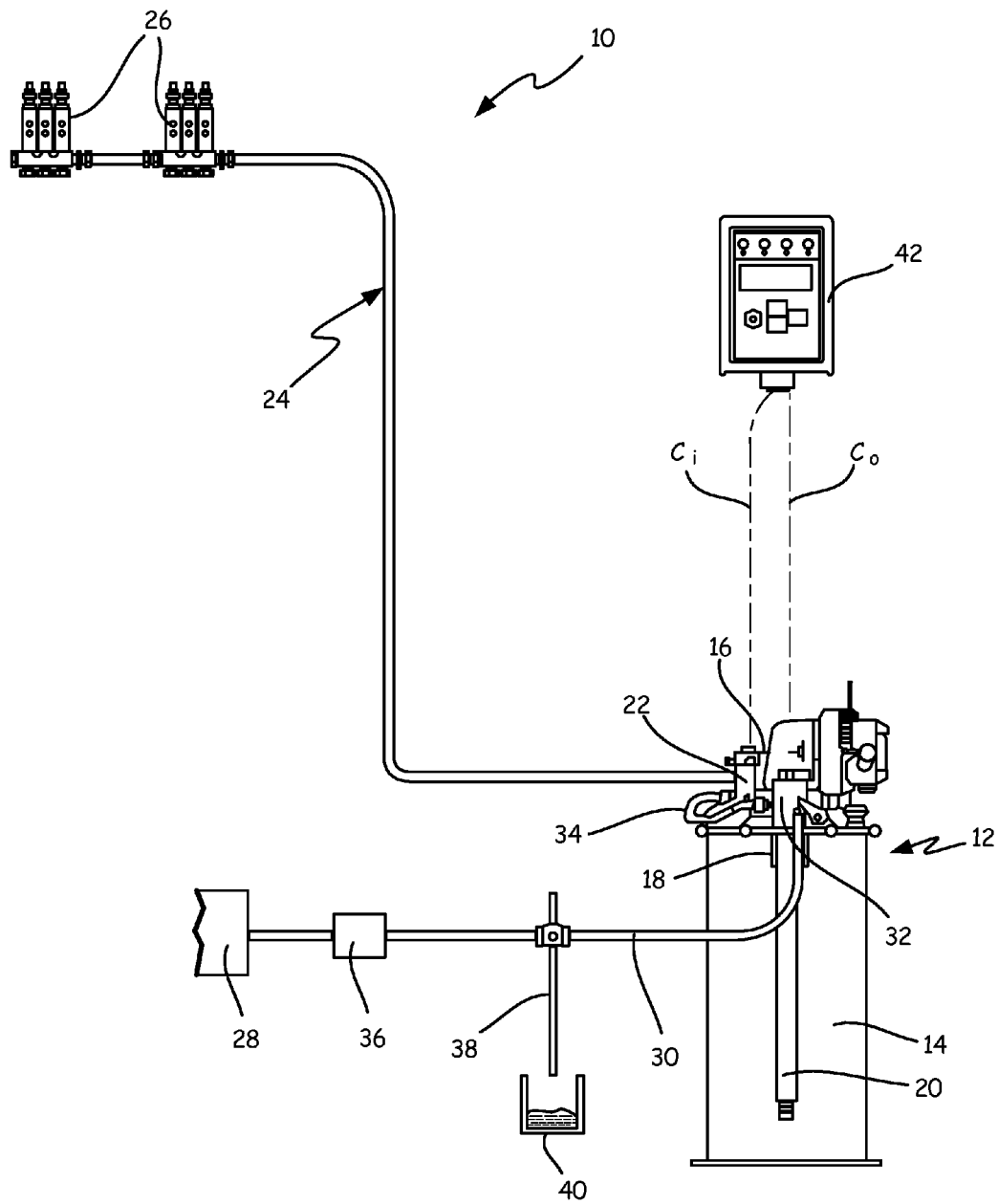
FIG. 1 is a schematic view of a lubrication system.

FIG. 1 is a schematic diagram of lubrication system 10, a system that receives, stores, and supplies lubricant fluid. Lubrication system 10 comprises local assembly 12 with lubricant reservoir 14, motor 16, pump 18, fluid tube 20, input/output manifold 22, lubricant work line 24, and lubricant injectors 26. Lubricant fluid from refill source 28 can be supplied to lubricant reservoir 14 via refill line 30, shutoff valve assembly 32, and reservoir inlet line 34. Refill pump 36 pressurized fluid from refill source 28, and dump line 38 can drain excess lubricant from refill line 30 into lubricant dump 40.

Local assembly 12 is a dedicated lubrication assembly for use with lubricated machinery such as pumps, pistons, seals, bearings, and/or shafts. Local assembly 12 can, for example, be a lubrication assembly mounted on a vehicle or other mobile device for lubrication of mobile components. Lubricant reservoir 14 is a tank or other container for lubricant fluid. In some embodiments, lubricant reservoir 14 can be a substantially cylindrical drum. Motor 16 drives pump 18, which in turn draws lubricant from lubricant reservoir 14 through fluid tube 20, and forces lubricant into lubricant work line 24 through input/output manifold 22, under pressure. Motor 16 can, for example, be an electrical or pneumatic motor. In one embodiment pump 18 is a piston pump. In alternative embodiments, pump 18 can be a reciprocating pump of any other kind, or a gear pump.

Fluid tube 20 is a lubricant-carrying tube that extends from a top location of lubricant reservoir 14 near input/output assembly 22 to bottom location near the base of lubricant reservoir 14. Although fluid tube 20 is depicted as a vertical cylindrical tube, alternative embodiments can bend, be angled, or otherwise have other shapes. Fluid tube 20 can, for example, be a nested tube with concentric inlet and outlet channels. Inlet/outlet manifold 22 provides the entrance and exit for lubricant into or from lubricant reservoir 14. Inlet/output manifold 22 connects to fluid tube 20, lubricant work line 24, and inlet line 34. Lubricant work line 24 is a fluid distribution line that carries lubricant from input/output manifold 22 to lubricant injectors 26, which can be distributed across a plurality of lubricated components (not shown). Although only one lubricant work line 24 is shown, some embodiments of local assembly 12 can comprise multiple lubricant work lines, all connected to input/output manifold 22. Lubricant injectors 26 are injectors for grease, oil, or other lubricant materials that are disposed at the locations of lubricated components. Lubricant injectors 26 can, for example, be spring-biased injectors pressurized by motor 18 that fire to supply a metered quantity of lubricant fluid.

Refill source 28 is a source of lubricant material used to refill lubricant reservoir 14, as needed. Refill source 28 can, for example, be a large stationary drum, tank, or container. When lubricant reservoir 14 is depleted, it can be refilled by attaching refill line 30 to shutoff valve assembly 32, which is fluidly connected to input/output manifold 22 via inlet line 34. Refill line 30 can, for example, be a detachable hose associated with refill source 28. Shutoff valve assembly 32 is a valve assembly disposed between refill source 28 and inlet/output manifold 22. Shutoff valve assembly 32 is biased open, but closes when lubricant reservoir 14 is full, preventing overfilling. When shutoff valve assembly 32 is open, fluid from refill source 28 can be pumped through refill line 30, shutoff valve assembly 32, and inlet line 34 into lubricant reservoir 14 by refill pump 36. Refill pump 36 can, for example, be a gear pump, a reciprocating cylinder pump, or any other appropriate pressurizing device. Once lubricant reservoir 14 has been filled, refill line 30 can be disconnected from shutoff valve assembly 32. Excess lubricant can be exhausted from refill line 30 via dump line 38. Dump line 38 can, for example, be an outlet line or spigot attached to refill line via a manually actuated valve. In some embodiments lubricant dump, can be a waste fluid dump. In other embodiments, lubricant dump 40 can be a recirculation dump that routes excess lubricant back to refill source 28.

Lubrication controller 42 is a logic-capable device such as a dedicated microprocessor or collection of microprocessors, or a non-dedicated computer loaded with appropriate control software. Lubrication controller 42 receives input signals $C_i$ reflecting states of local assembly 12, and controls motor 16 and actuators of local assembly 12 via output signals $C_o$. Lubrication controller 42 can be a part of local assembly 10, or can be a remote controller that communicates with local assembly 12 via a remote data connection such as a wireless connection. Lubrication controller 42 can include user interface components such as a screen, keypad, and/or communication transceiver to provide data to local or remote users, and accept user input commands. In some embodiments lubrication controller 42 can output alarm or alert messages (e.g. via digital signals, lights, and/or sounds) indicating changes in operation of local assembly 12.

Local assembly 12 supplies lubricant to machine components that can be portable or otherwise mobile away from refill source 28. Lubricant reservoir 14 can be refilled as needed, allowing local assembly 12 to operate independently from lubricant source for extended periods, e.g. while associated machine components are in use at a location remote from refill source 28.

Figure 2:
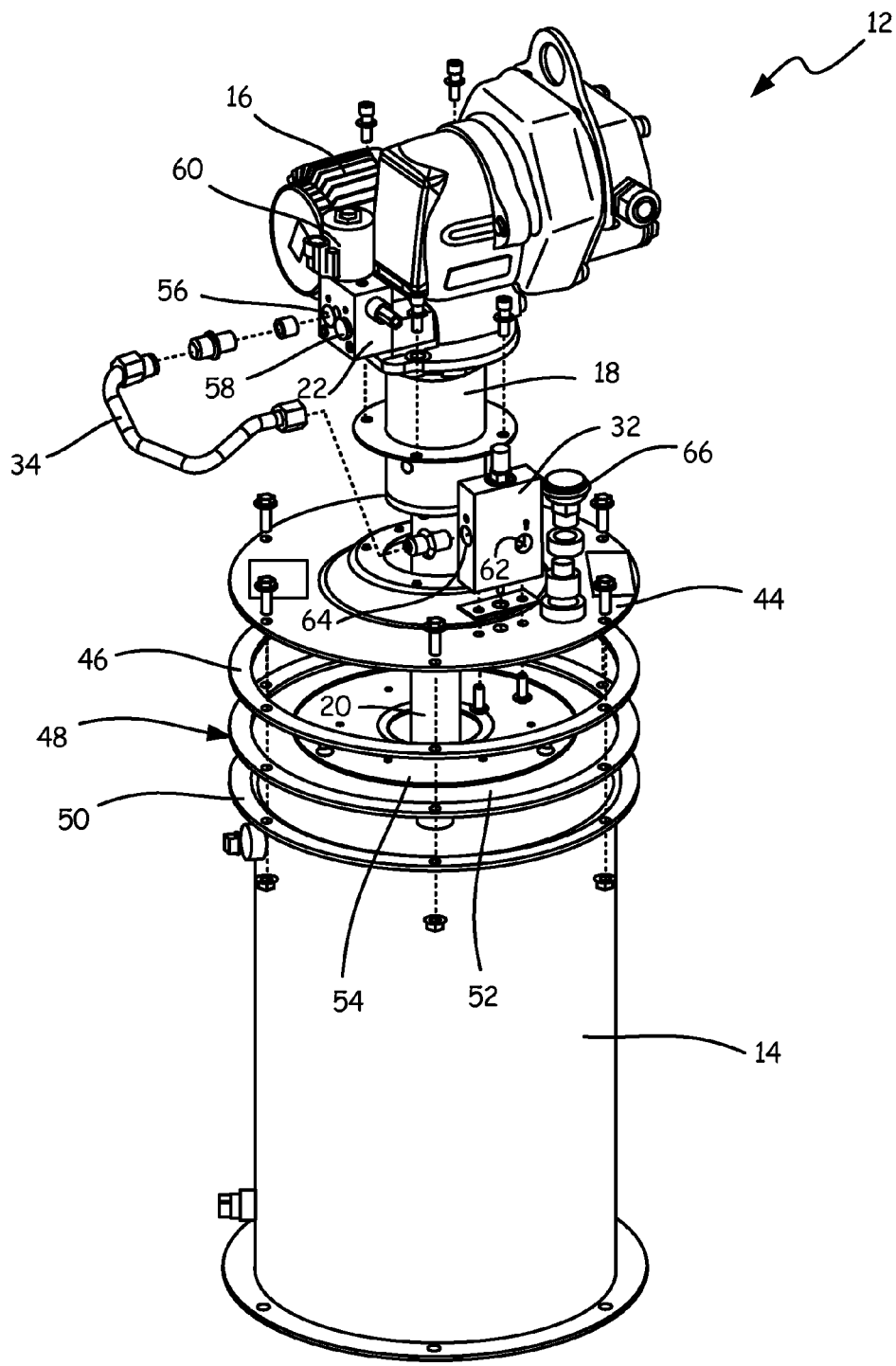
FIG. 2 is an exploded view of a portion of the lubrication system of FIG. 1.

FIG. 2 is an exploded view of a portion of local assembly 12, illustrating lubricant reservoir 14, motor 16, pump 18, fluid tube 20, inlet/output manifold 22, shutoff valve assembly 32, and inlet line 34 as described above. FIG. 2 further depicts cover plate 44, seal ring 46, follower plate 48, reservoir lip 50, flexible diaphragm 52, fill plate 54, main inlet 56, main outlet 58, vent valve solenoid 60, refill inlet 62, refill outlet 64, and air vent 66.

In the depicted embodiment, cover plate 44 is a substantially flat cover to lubricant reservoir 14 that serves as an base for motor 16, pump 18, shutoff valve assembly 32, and air vent 66. In an assembled state, cover plate 44 is bolted to seal ring 46, follower plate 48, and reservoir lip 50. Reservoir lip 50 is an annular flange of lubricant reservoir disposed to receive fasteners and form a fluid seal with follower plate 48. Follower plate 48 and seal ring 46 are disposed between reservoir lip 50 and cover plate 44. In the depicted embodiment, follower plate 48 is a diaphragm plate that includes flexible diaphragm 52 and at least one fill plate 54. When reservoir 14 is not full, the weight of fill plate 54 causes flexible diaphragm 52 to bow downward, away from cover plate 44. As reservoir 14 is filled, lubricant within lubricant reservoir 14 forces flexible diaphragm 52 and fill plate 54 upwards. In some embodiments, this upwards deformation of follower plate 48 can actuate shutoff valve assembly 32, causing shutoff valve assembly 32 to close when lubricant reservoir 14 is full. In alternative embodiments, other kinds of follower plates can be used instead. Air vent 66 is a covered aperture in cover plate 44 that permits airflow beneath follower plate to avoid suction as lubricant levels fall in lubricant reservoir 14. In some embodiments, flexible diaphragm 52 and/or fill plate 54 may include air flow apertures that allow airflow through follower plate 48, but close to obstruct lubricant flow.

As described with respect to FIG. 1, inlet/output manifold 22 is a fluid manifold with fluid passages into/out of fluid tube 20. Main inlet 56 and main outlet 58 are input and output ports of inlet/output manifold 22, respectively. Main outlet 58 connects to lubricant work line 24. In some embodiments, inlet/output manifold 22 can have multiple main outlets servicing multiple lubricant work lines. Main inlet 56 receives refill lubricant from refill source 28 via inlet line 34 and refill line 30. Although inlet line 34 is illustrated as a hose, alternative embodiments of inlet line 34 may for example be rigid tubes or channels. Inlet line 34 connects main inlet 56 to refill outlet 64, and outlet port of shutoff valve assembly 32. Refill lubricant enters shutoff valve assembly 32 at refill inlet 62, exits shutoff valve assembly 32 at refill outlet 64 (if shutoff valve assembly 32 is open), and continues into lubricant reservoir 14 through inlet line 34, main inlet 56, and fluid tube 20.

In the depicted embodiment, inlet/output manifold 22 is equipped with vent valve solenoid 60, an actuator solenoid that drives a vent valve integral to inlet/output manifold 22. Vent valve solenoid 60 actuates valving in inlet/output manifold 22 according to command signals included among output signals $C_o$ from lubrication controller 42. In this way, inlet/output manifold 22 is able to switch between pumping and vent modes. In pumping modes, pump 18 can drive fluid from lubricant reservoir 14 through main outlet(s) 58 to lubricant work line(s) 24, and/or lubricant reservoir 14 can receive pumped refill lubricant from refill source 28, through main inlet 56. In vent modes, pressurized fluid in lubricant work line 24 is allowed to recycle back through inlet passages of inlet manifold 22 into lubricant reservoir 14 as a pressure relief mechanism.

Figure 3:
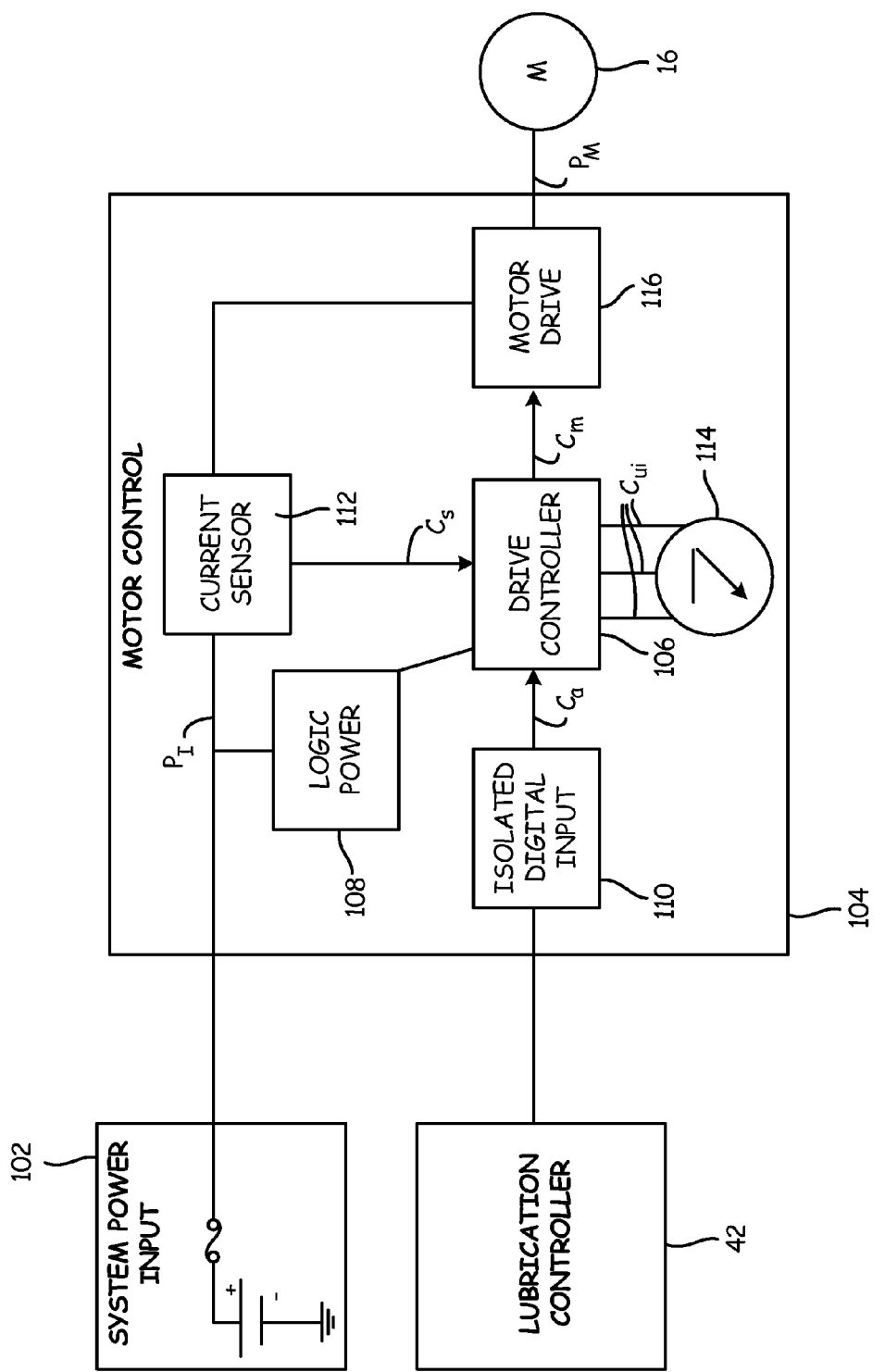
FIG. 3 is schematic block diagram of an electronic pump motor control system for the lubrication system of FIG. 1.

FIG. 3 is a schematic block diagram of electronic control system 100, a pump motor control system for motor 16. Electronic control system 100 governs the supply of power to motor 16, and the resulting operation of pump 18. Electronic control system 100 includes motor 16, lubrication controller 42, system power input 102, motor control 104, drive controller 106, logic power supply 108, isolated data input 110, current sensor 112, user input device 114, and motor drive 116.

As described above with respect to FIGS. 1 and 2, lubrication controller 42 is a control device in communication with motor 16, and in some embodiment with other components of lubrication system 10. System power input is a power connection to a local power source such as a battery, generator, or grid line. System power input 102 can, for example, be an electrical connection to a direct current (DC) power supply. Motor control 104 is a system of control logic dedicated to motor 16. In some embodiments, motor control 104 can be incorporated (e.g. on a printed wiring board) within the enclosure of motor 16. Motor control 104 receives activation commands $C_a$ from lubrication controller 42, and input power $P_I$ from system power source 102. Activation commands $C_a$ specify when motor 16 should turn on and off. Motor control 104 supplies power to motor 16 in response to activation commands $C_a$, and as a function of the sensed current of input power $P_I$ and a user-defined current setpoint.

Motor control 104 includes drive controller 106 and motor drive 116. Drive controller 106 controls power supplied to motor drive 116 from system power input 102. Drive controller 106 is a microprocessor-based device that receives power from input power $P_I$ via logic power supply 108, and actuation commands $C_a$ from lubrication controller 42 via isolated digital input 110. Isolated digital input 110 is a data-only connection whereby lubrication controller 42 provides on- and off-commands for motor 16. Drive controller 106 receives sensed current signal $c_s$ from current sensor 112, which is disposed between system power input 102 and motor drive 116. Sensed current signal $c_s$ reflects the instantaneous current received from system power input 102, which can vary over time as a function of system operation, environment, and changes in power source. Drive controller 106 further receives user input current signal $c_{ui}$ from user input device 114, which can for example be a dial, knob, or keypad. User input current signal $c_{ui}$ reflects a user-defined current set-point specified by a human user. Users may vary user input current signal $c_{ui}$ depending on operational conditions. Variations in environmental temperature and/or humidity of lubrication system 10, for instance, can affect lubricant viscosity, necessitating corresponding changes to motor drive power.

Drive controller 106 can, for example, be a microprocessor-based device running a proportional-integral-derivative (PID) loop that generates a pulse width modulated motor control signal $C_m$ as a function of sensed current $c_s$ and user input current $c_{ui}$. In alternative embodiments, drive controller 106 can run a proportional loop of another kind, such as a proportional integral (PI) or a proportional derivative (PD) loop. Logic power supply 108 provides continuous power to drive controller 106 regardless of the control state of lubrication controller 42. Activation command $C_a$ is independent of input power $P_I$, and governs whether motor control signal $C_m$ permits power to be delivered to motor 16.

Motor control signal $C_m$ modulates input power $P_I$ from system power input 102 to achieve pump current substantially matching user-defined current set-point $c_{ui}$ provided via user input device 114. In this way, drive controller 106 continuously controls motor drive power towards a user-specified set-point, whenever lubrication controller 42 specifies that pump 18 should be active.

Discussion of Possible Embodiments

The following are non-exclusive descriptions of possible embodiments of the present invention.

A motor control system for a lubricant pump motor, the motor control system comprising: a pump system power input configured to supply system power; a motor drive configured to drive the lubricant pump motor using the system power; a current sensor disposed between the pump system power input and the motor drive to sense an input current of the system power; a lubrication controller configured to provide motor activation signals; and a drive controller disposed to receive the motor activation signals via isolated digital input, and control the motor drive as a function of the sensed input current and a user-defined current set-point, in response to the activation signals.

The motor control system of the preceding paragraph can optionally include, additionally and/or alternatively, any one or more of the following features, configurations and/or additional components:

A further embodiment of the foregoing motor control system, wherein the drive controller controls the motor drive via a pulse width modulated control signal.

A further embodiment of the foregoing motor control system, wherein the drive controller runs a proportional-integral-derivative (PID) loop.

A further embodiment of the foregoing motor control system, wherein the drive controller is a microprocessor device.

A further embodiment of the foregoing motor control system, wherein the microprocessor is powered by the system power.

A further embodiment of the foregoing motor control system, further comprising an input device whereby users can specify the user-defined current set-point.

A lubrication system comprising: a lubricant reservoir; a lubricant pump configured to draw fluid from the lubricant reservoir; a pump motor configured to drive the lubricant pump; a system power input for electrical input power to drive the pump motor; a lubrication controller configured to provide activation signals for the pump motor; and a motor controller disposed to receive the activation signals as an isolated digital input, and control electrical power delivered from the system power input to the pump motor using a drive controller as a function of a user-defined current set-point and a sensed current of the electrical input power, in response to the activation signals.

The lubrication system of the preceding paragraph can optionally include, additionally and/or alternatively, any one or more of the following features, configurations and/or additional components:

A further embodiment of the foregoing lubrication system, further comprising a motor drive configured to receive the electrical input power from the system power input, and to receive a pulse-width-modulated (PWM) motor control signal from the drive controller modulating the electrical input power.

A further embodiment of the foregoing lubrication system, wherein sensed current is sensed by a current sensor disposed between the system power input and the motor drive.

A further embodiment of the foregoing lubrication system, wherein the motor controller is powered by the electrical input power.

A further embodiment of the foregoing lubrication system, wherein the motor controller allows power to be delivered to the pump motor only when indicated by the activation signals.

A further embodiment of the foregoing lubrication system, wherein the drive controller runs a proportional-integral-derivative control loop.

A further embodiment of the foregoing lubrication system, further comprising an input device whereby users can specify the user-defined current set-point.

A further embodiment of the foregoing lubrication system, wherein the input device is a knob.

A further embodiment of the foregoing lubrication system, wherein the drive controller is a microprocessor-based device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A motor control system for a lubricant pump motor, the motor control system comprising:
   a pump system power input configured to supply system power;
   a motor drive configured to drive the lubricant pump motor using the system power;
   a current sensor disposed between the pump system power input and the motor drive to sense an input current of the system power;
   a lubrication controller configured to provide motor activation signals; and
   a drive controller disposed to receive the motor activation signals via isolated digital input, and control the motor drive as a function of the sensed input current and a user-defined current set-point, in response to the activation signals; wherein the drive controller is a microprocessor device.

2. The motor control system of claim 1, wherein the drive controller controls the motor drive via a pulse width modulated control signal.

3. The motor control system of claim 1, wherein the drive controller runs a proportional-integral-derivative (PID) loop.

4. The motor control system of claim 1, wherein the microprocessor device is powered by the system power.

5. The motor control system of claim 1, further comprising an input device whereby users can specify the user-defined current set-point.

6. A lubrication system comprising:
   a lubricant reservoir;
   a lubricant pump configured to draw fluid from the lubricant reservoir;
   a pump motor configured to drive the lubricant pump;
   a system power input for electrical input power to drive the pump motor;
   a lubrication controller configured to provide activation signals for the pump motor; and
   a motor controller disposed to receive the activation signals as an isolated digital input, and control electrical power delivered from the system power input to the pump motor using a drive controller as a function of a user-defined current set-point and a sensed current of the electrical input power, in response to the activation signals; wherein the drive controller is a microprocessor-based device.

7. The lubrication system of claim 6, further comprising a motor drive configured to receive the electrical input power from the system power input, and to receive a pulse-width-modulated (PWM) motor control signal from the drive controller modulating the electrical input power.

8. The lubrication system of claim 7, wherein sensed current is sensed by a current sensor disposed between the system power input and the motor drive.

9. The lubrication system of claim 6, wherein the motor controller is powered by the electrical input power.

10. The lubrication system of claim 6, wherein the motor controller allows power to be delivered to the pump motor only when indicated by the activation signals.

11. The lubrication system of claim 6, wherein the drive controller runs a proportional-integral-derivative control loop.

12. The lubrication system of claim 6, further comprising an input device whereby users can specify the user-defined current set-point.

13. The lubrication system of claim 12, wherein the input device is a knob.

* * * * *